United States Patent [19]

Nakayama

[11] 4,280,159
[45] Jul. 21, 1981

[54] METHOD OF AND APPARATUS FOR INDICATING LENGTH AND REMAINING RECORDING CAPACITY OF A RECORDING TAPE

[75] Inventor: Masayuki Nakayama, Tokyo, Japan

[73] Assignee: Sony Corporation, Tokyo, Japan

[21] Appl. No.: 34,768

[22] Filed: Apr. 30, 1979

[30] Foreign Application Priority Data

May 8, 1978 [JP] Japan .................................. 53-54251

[51] Int. Cl.³ ........................ G11B 15/00; G11B 27/00
[52] U.S. Cl. .................................... 360/137; 242/191; 242/207
[58] Field of Search .................. 360/137; 235/92 EV, 235/92 MP, 92 SH, 92 FQ; 242/207, 208, 209, 210, 191

[56] References Cited

U.S. PATENT DOCUMENTS

| | | | |
|---|---|---|---|
| 2,779,826 | 1/1957 | Scott | 360/137 |
| 4,001,552 | 1/1977 | Muller | 242/191 |
| 4,044,233 | 8/1977 | Sato | 242/191 |
| 4,140,896 | 2/1979 | Robertson | 235/92 SH |
| 4,157,488 | 6/1979 | Allan | 242/191 |
| 4,172,231 | 10/1979 | d'Alayer de Costemore | 242/191 |
| 4,177,488 | 12/1979 | Sakai | 360/137 |

*Primary Examiner*—Jay P. Lucas

*Attorney, Agent, or Firm*—Lewis H. Eslinger; Alvin Sinderbrand

[57] ABSTRACT

A method and apparatus for indicating the type, such as in terms of overall recording capacity, and remaining recording capacity of a recording tape. The tape is transported at a predetermined speed from a supply reel to a take-up reel. The rotations of the respective reels are sensed and the rotational periods $T_s$ and $T_t$ of the supply and take-up reels, respectively, are determined. Based upon these determined rotational periods, predetermined characteristics, such as the overall recording capacity, of the recording tape are indicated, irrespective of the arbitrary amount of tape which, initially, is wound upon the take-up reel. For example, a set of characteristics is stored for each value of $T_s^2 + T_t^2$; and the one set which is associated with the determined value $T_s^2 + T_t^2$ is selected. Also, the determined rotational periods $T_s$ and $T_t$ are combined with certain of said characteristics to indicate the amount of tape which remains upon the supply reel when that amount initially is unknown. The latter operation is carried out in accordance with the expression $T_R = P/1 + \alpha^2 - Q$, wherein $T_R$ represents the recording capacity of the tape which remains on the supply reel, $\alpha^2 = (T_t/T_s)^2$, and P and Q are constant values associated with the type of tape which is used and are determined by the diameter of the supply (or take-up) reel hub, the total length of recording tape, the thickness of the tape, and the speed at which the tape is driven.

22 Claims, 6 Drawing Figures

METHOD OF AND APPARATUS FOR INDICATING LENGTH AND REMAINING RECORDING CAPACITY OF A RECORDING TAPE

BACKGROUND OF THE INVENTION

This invention relates to a method and apparatus for determining predetermined characteristics of a reel-to-reel recording tape, such as the total overall recording capacity of that tape, and also for determining the remaining recording capacity of that tape even if an unknown quantity of tape already has been transported from its supply reel to its take-up reel.

In many types of recording/reproducing devices, such as video tape recorders (VTR's), audio tape recorders, and the like, various types of recording tapes can be used therewith. Typically, such tapes are housed within a cartridge and are transported, during a recording/reproducing operation, from a supply reel to a take-up reel. Usually, when a tape cassette first is loaded onto the recording/reproducing device, the user is cognizant of the overall recording capacity of that tape (e.g. thirty minutes, one hour, two hours, three hours, and the like), and often the tape is fully rewound onto its supply reel before using. As recording/reproducing proceeds, an indicator, such as a digital counter, provides an indication as to the amount of tape which has been transported to the take-up reel or, alternatively, the amount of tape which remains on the supply reel. These indications provide the user with useful information, for example, as to whether there is sufficient tape remaining to complete the desired recording operation.

There are, however, instances wherein an unknown tape cassette is loaded onto the recording/reproducing device. If the user wishes to know the type of cassette which has been loaded into the device, that is, if the user wishes to know the total overall recording capacity of that cassette, it is necessary to unload the cassette from the recording/reproducing device. In some applications, it may be preferred not to unload the cassette, determine its type and then re-load the cassette back into the device. For example, in a VTR of the type which withdraws a length of tape from the cassette and deploys that withdrawn tape about a recording drum, the exact location of the tape which is positioned for recording may not be the same following the re-load operation as was previously positioned. This may be particularly detrimental during an edit operation.

Furthermore, if a tape cassette that has been partially used, that is, some amount of tape already has been used for recording/reproducing, is loaded into the device, an accurate indication of the amount of tape remaining on the supply reel, or the amount that already has been wound upon the take-up reel, cannot be readily obtained. It may be necessary first to rewind the tape completely to its initial, start position, and then to advance the tape to the location at which it had been loaded into the device. The usual digital counter, if reset after the tape had been fully rewound, then will indicate either the amount of tape which remains for recording or the amount of tape which has been used. It is appreciated that this is a time-consuming and annoying task. Nevertheless, it often is the only technique by which a user can be apprised of the amount of tape which remains for recording.

It has been proposed, in copending application Ser. No. 963,319, to indicate the amount of tape which remains on a supply reel in a cassette used in a VTR, even if an unknown quantity of tape already has been used. However, in this proposal, the determination of the amount of remaining tape is based upon sensing the angular velocity of the supply reel as that reel rotates when tape is withdrawn from the cassette and loaded onto the VTR recording apparatus. During this tape-loading operation, which is to be distinguished from a tape transporting operation wherein tape is driven from the supply reel to the take-up reel, the take-up reel is held stationary. Also, in this proposed technique, there is no suggestion of determining automatically the type of cassette which is used, that is, the total overall recording capacity of that cassette.

OBJECTS OF THE INVENTION

Therefore, it is an object of the present invention to provide an improved method and apparatus for indicating automatically predetermined characteristics, such as the total overall recording capacity, of a recording tape, regardless of the amount, if any, of tape which has been wound from its supply reel to its take-up reel.

Another object of this invention is to provide a method and apparatus for indicating automatically the amount of tape which remains for a recording operation regardless of the arbitrary quantity of tape which already may have been wound from the supply reel to the take-up reel thereof.

Yet another object of this invention is to provide an improved method and apparatus for indicating predetermined characteristics of a reel-to-reel tape, and for indicating the amount of such tape which remains for a recording/reproducing operation, regardless of the arbitrary quantity of tape which already may have been used.

A still further object of this invention is to provide an improved method and apparatus for indicating the type and quantity of tape which is used in a recorder/reproducer, which overcomes those problems and disadvantages mentioned hereinabove.

A still further object of this invention is to provide a method and apparatus for indicating the amount of tape which remains for a recording/reproducing operation, even if particular characteristics of the tape, such as its total overall recording capacity, are not known.

Another object of this invention is to provide apparatus for use in a recorder/reproducer of the type wherein tape is transported from a supply reel to a take-up reel, to indicate automatically the total overall recording capacity of that tape and, moreover, to indicate the quantity of tape which remains available for recording/reproducing during an initial, or preliminary operation of the recorder/reproducer.

Various other objects, advantages and features of the present invention will become readily apparent from the ensuing detailed description, and the novel features will be particularly pointed out in the appended claims.

SUMMARY OF THE INVENTION

In accordance with this invention, a method and apparatus are provided for indicating predetermined characteristics, such as the total overall capacity, of a recording tape which is transportable at a predetermined speed from a supply reel to a take-up reel. The respective rotations of the supply and take-up reels are sensed, and the rotational periods $T_s$ and $T_t$ of the supply and take-up reels, respectively, are determined. Predetermined characteristics of the recording tape are indicated as a function of the determined rotational periods. For example, representations of different recording capacities are stored, each stored representation being associated with a respective signal representing $T_s^2 + T_t^2$. The stored representation which is associated with the determined rotational periods $T_s$ and $T_t$ is selected and displayed. In accordance with another aspect of this invention, the amount of tape wound upon the supply (or take-up) reel is indicated as a function of the determined rotational periods $T_s$ and $T_t$ and also selected characteristics which are inherent in the tape. In this regard, the remaining recording capacity $T_R$ of the tape wound on the supply reel is determined in accordance with the expression $T_R = P/(1+\alpha^2) - Q$, wherein P and Q are constant values associated with the tape which is used, these values being determined by the diameter of the hub of the supply reel, the total length of the recording tape, the thickness of the tape and the predetermined speed at which the tape is driven; and $\alpha^2 = (T_t/T_s)^2$. Signals representing P and Q associated with each value $(T_s^2 + T_t^2)$ are stored, and the proper P and Q signals are selected for use in the above equation as a function of the determined rotational periods of the supply and take-up reels. The signal representing $T_R$ may be displayed.

BRIEF DESCRIPTION OF THE DRAWINGS

The following detailed description, given by way of example, will best be understood in conjunction with the accompanying drawings in which.

DETAILED DESCRIPTION OF A PREFERRED EMBODIMENT

As will become apparent from the following detailed description, the present invention finds ready application either in a video tape recorder of the type in which a loop of magnetic recording tape is withdrawn from a cassette housing and deployed about a recording/reproducing drum, or in an audio tape recorder wherein recording tape merely is transported from a supply reel to a take-up reel past a recording/reproducing head. In both types of recorders, the tape is driven at a substantially constant speed by the combination of a capstan and pinch roller, as is well known. Depending upon the type of recorder, this transport speed is fixed and constant. Furthermore, in the following discussion, it is assumed that the tape is housed within a cassette. Alternatively, in both the VTR and audio recorder applications, the tape may be transported in simple reel-to-reel arrangements in the absence of a cassette or cartridge.

Figure 1:
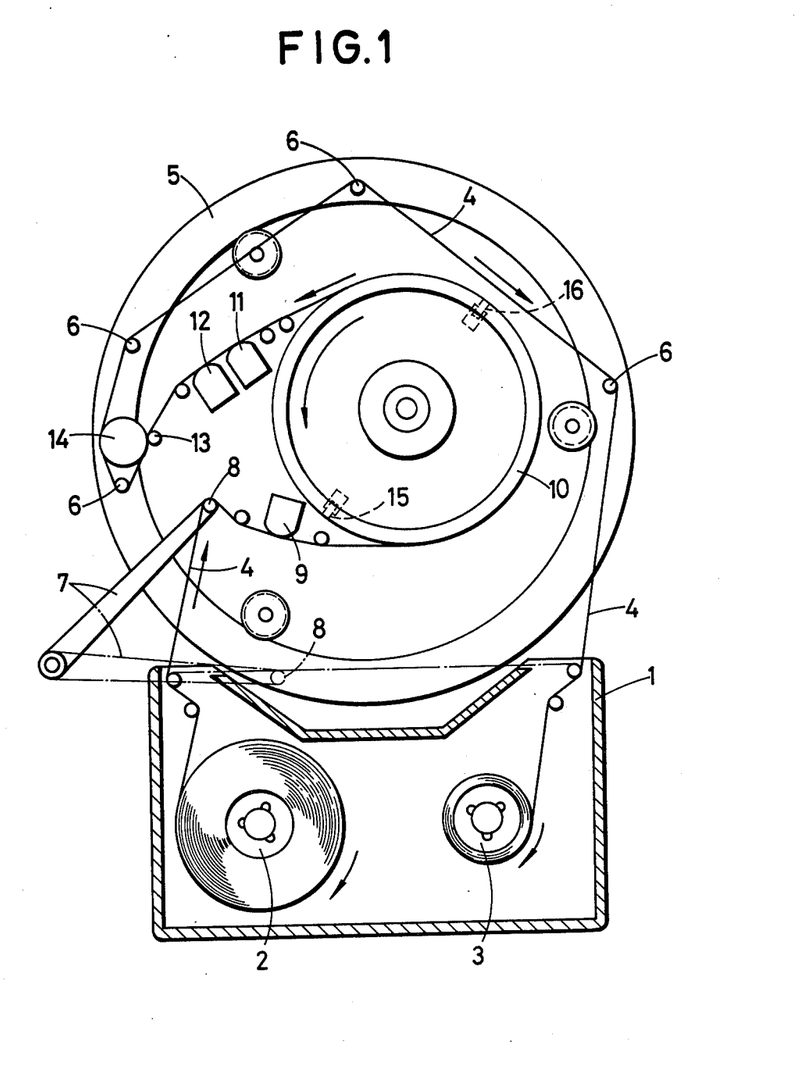
FIG. 1 illustrates one application of the present invention in the environment of a VTR.

Turning now to FIG. 1, there is illustrated a typical embodiment of a VTR in which the present invention can be used. This VTR includes a guide drum 10 adapted to receive a portion of magnetic tape 4 deployed thereabout and having a pair of rotary transducers, or heads 15, 16 for scanning successive parallel tracks across the tape which is deployed about the drum. The VTR is adapted to receive a tape cartridge 1 which contains a supply reel 2 and a take-up reel 3 for transporting tape 4 therebetween. The VTR further includes a tape-loading mechanism schematically illustrated as comprising a circular support ring 5 which extends around drum 10 and which is supported for rotation on various guide rollers. The VTR further includes a tape-loading mechanism comprised of a pivotal arm 7 and a tape-engaging pin 8, as well as various pins or rollers 6 which extend upwardly from support ring 5. Pins or rollers 6 are adapted to move with the support ring during a loading and unloading operation so as to guide tape 4 about guide drum 10.

When cartridge, or cassette 1 first is positioned, or loaded, into the VTR, pivotal arm 7 is disposed in the position represented by the broken lines such that tape guiding pin 8 thereon extends upwardly into an opening normally provided on the housing of cassette 1 so as to be positioned within the housing and behind the run of tape 4. When a loading operation is carried out, pivotal arm 7 pivots to the position represented by the solid lines, thereby withdrawing a portion of tape 4 from cassette 1. This portion of withdrawn tape also engages an adjacent pin or roller 6 which is proximate pivotal arm 7. Then, support ring 5 rotates in the counterclockwise direction so as to pull tape 4 from cassette 1 and then to deploy this withdrawn tape about a portion of the periphery of guide drum 10. A pinch roller 14 is rotatably mounted on support ring 5; and when this support ring is fully rotated to its loaded position, as illustrated in FIG. 1, the pinch roller is brought into contact with a capstan 13, the latter being fixedly supported in the VTR. Hence, capstan 13 and pinch roller 14 capture tape 4 therebetween such that as the capstan is driven, tape 4 is transported at a constant speed in the direction indicated by the arrows. The run followed by tape 4 in response to the operation of capstan 13 and pinch roller 14 traverses an erasing head 9, an autio erasing head 11 and an audio recording/playback head 12. Thus, erasing head 9 serves to erase video signals from tape 4, erasing 11 serves to erase audio signals from the tape and head 12 serves to record or play back audio signals during a recording or reproducing mode, respectively. As tape 4 is driven in the direction indicated by the arrows about the loop from supply reel 2 to take-up reel 3, guide drum 10 rotates in the direction indicated by the arrow such that heads 15 and 16 scan successive, parallel, skewed tracks across the width of tape 4. During a recording operation, heads 15 and 16 serve to record video signals on the tape. During a reproducing operation, previously recorded video signals are played back.

In accordance with one aspect of the present invention, if cassette 1 is loaded into the VTR, but the type of cassette is not known, that is, the total overall recording capacity of that cassette has not been ascertained, such total overall recording capacity can, nevertheless, be indicated automatically. This indication is provided regardless of whether a fresh cassette is loaded into the VTR, that is, regardless of whether all of tape 4 is wound initially on supply reel 2, or whether an unknown quantity of tape already has been transported and wound onto takeup reel 3. In accordance with another aspect of this invention, even if an arbitrary amount of tape is wound upon take-up reel 3, the recording capacity of the remaining amount of tape that is wound on supply reel 2 can be indicated automatically.

Figure 2:
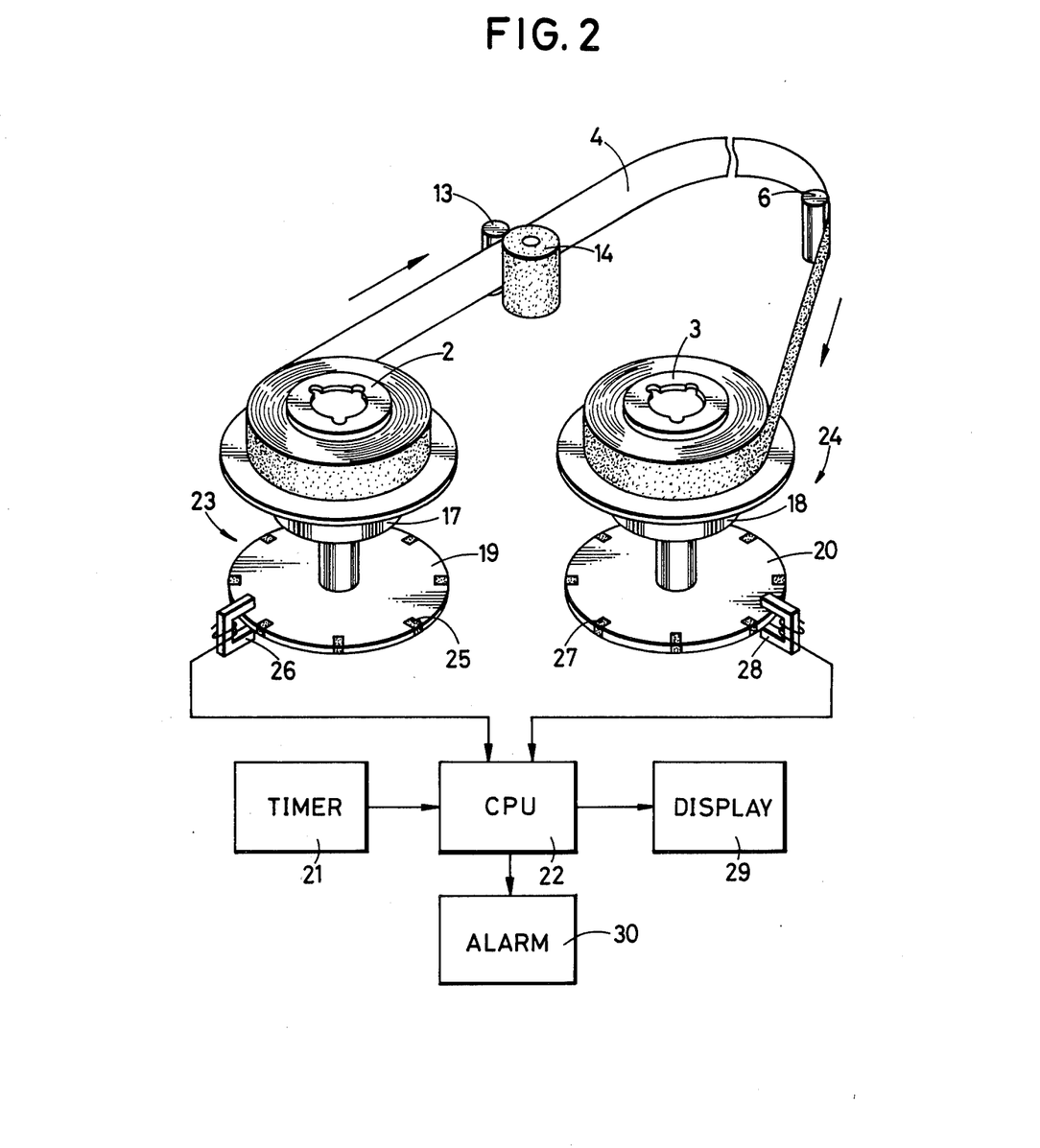
FIG. 2 represents the manner in which the present invention is used either in a VTR or in an audio recording system.

Referring now to FIG. 2, the elements which are used to indicate the type of tape and the amount or recording capacity thereof are illustrated. FIG. 2 merely shows tape 4 transported from supply reel 2 to take-up reel 3 via the combination of capstan 13 and pinch roller 14. This tape transport apparatus therefore may be included in the VTR arrangement shown in FIG. 1 or, alternatively, may be included in an audio recorder/reproducer of conventional type. In either embodiment, the type of cassette which is used, that is, the total overall recording capacity of that cassette, as well as the remaining amount of tape which is wound upon supply reel 2, are indicated automatically.

The illustrated apparatus includes a central processing unit (CPU) 22, which may comprise a microprocessor, a microcomputer, or the like, that is supplied with pulses which represent the rotational periods of the supply and take-up reels, respectively. CPU 22 is adapted to process these pulses and, based thereon, to determine the type (e.g. total overall recording capacity) of tape which has been loaded onto the VTR (or the audio recorder/reproducer) and also to determine the remaining recording capacity of that tape. CPU 22 is coupled to a display device 29 which is adapted to display the determined type and remaining recording capacity of tape 4. The CPU additionally includes another input connected to a presettable timer 21, the latter being adapted to be preset to represent the requisite recording time for completing a particular recording task. CPU 22 is adapted to compare this preset recording time to the determined remaining recording capacity of tape 4 to ascertain whether there is sufficient recording capacity to complete the desired operation. The output of CPU 22 is connected to an alarm device 30 which is operated, or triggered, in the event that the determined remaining recording capacity is less than the desired capacity, as represented by preset timer 21.

The aforementioned pulses which are supplied to CPU 22 to represent the rotational periods of supply reel 2 and take-up reel 3 are generated by detecting arrangements 23 and 24. Detecting arrangement 23 is comprised of a rotatable member, such as disc 19, secured to reel mount 17 of supply reel 2. Rotatable member 19 thus is rotatably driven when supply reel 2 rotates to pay out tape 4. A circular array of magnetic elements 25 is provided on the periphery of rotatable member 19. A pick-up sensor 26, such as a magnetic pick-up head, is fixedly positioned relative to rotatable member 19 so as to detect each magnetic element 25 as that element rotates therepast. Sensor 26 generates a pulse in response to the passage of each magnetic element 25.

Sensing arrangement 24 is of similar construction and is comprised of a rotatable member, or disc 20, that is secured to reel mount 18 of take-up reel 3. A circular array of magnetic elements 27 is provided on the periphery of rotatable member 20; and a pick-up sensing head 28 is positioned so as to detect each magnetic element that rotates therepast and to generate a corresponding pulse. The pulses generated by pick-up sensors 26 and 28 are supplied to CPU 22.

It may be appreciated that, if desired, rotatable members 19 and 20 may be mechanically coupled to supply and take-up reels 2 and 3, respectively, by other suitable transmissions so as to be rotatable with these reels.

If each rotatable member 19, 20 is provided with, for example, eight individual magnetic elements 25, pick-up sensor 26, 28 generates eight pulses for each single rotation of the rotatable member. The rotational speed of supply reel 2 or take-up reel 3 can be determined by dividing the number of pulses which are generated by pick-up sensor 26, 28 by the time duration during which tape 4 is driven. For example, if forty pulses are generated during a two second interval, then the frequency of these pulses is equal to twenty pulses per second. Since eight pulses are generated during each rotation, the angular velocity of the rotatable member is seen to be 20/8=2.5 rotations per second.

Of course, the rotational period of the disc is the reciprocal of the angular velocity thereof which, in the present example, is equal to 1/2.5=0.4, or 400 msec. CPU 22 functions in a manner that is clearly appreciated by one of ordinary skill in the art to determine the rotational periods $T_s$ and $T_t$ of supply reel 2 and take-up reel 3, respectively, in response to the pulses which are generated by pick-up sensors 26 and 28.

In operation, let it be assumed that the cassette is properly loaded onto the VTR or audio recorder/reproducer with which tape 4 is to be used. This means that, for the application of the present invention to a VTR, tape 4 is deployed about the VTR guide drum in the manner illustrated in FIG. 1. Once the cassette is properly loaded, the tape transport mechanism (not shown) is operated for a predetermined time duration, on the order of a few seconds. Hence, during this time duration, tape 4 is driven by the combination of capstan 13 and pinch roller 14 from supply reel 2 to take-up reel 3. As the tape is driven in this manner, supply reel 2 rotates to pay out the tape; and take-up reel 3 also rotates to wind up the tape. Rotatable members 19 and 20 rotate with supply and take-up reels 2 and 3, thereby moving magnetic elements 25 and 27 past pick-up sensors 26 and 28, respectively. Consequently, pulses are supplied to CPU 22 from pick-up sensors 26 and 28, the respective frequencies of these pulses being a function of the rotational velocity, or speed, of the supply and take-up reels. CPU 22 processes these pulses to produce signals, such as digital signals, representing the rotational period $T_s$ of supply reel 2 and the rotational period $T_t$ of take-up reel 3. These signals representing the rotational periods of the supply and take-up reels are used to determined the total overall length, or recording capacity, of tape 4.

This overall length, or recording capacity, is determined irrespective of the arbitary amount of tape which may have been wound upon take-up reel 3 at the time that the cassette was loaded onto the VTR or audio recorder/reproducer. For example, if twenty minutes worth of tape initially had been wound upon take-up reel 3, and if the total overall recording capacity, or length, of tape 4 is equal to three hours, CPU 22 will determine that, during the initial transport of tape 4 from supply reel 2 to take-up reel 3, the tape has an overall length capable of recording up to three hours. That is, CPU 22 will determine that tape 4 is a so-called three-hour recording tape, even though twenty minutes of recording time has been used. CPU 22 also will determine the amount of tape remaining on supply reel 2. In a preferred embodiment, CPU 22 will control display device 29 to display that two hours, forty minutes of tape remains on supply reel 2. This display is provided even though, initially, the quantity of tape which had been wound upon take-up reel 3 had not been known.

Let it be further assumed that, initially, although the user had not been cognizant of the amount of tape remaining on supply reel 2, timer 21 had been preset to, for example, two hours, forty-five minutes. In the presently assumed example, CPU 22 determines that only two hours, forty minutes of tape is wound upon supply reel 2. Hence, since the preset time entered into timer 21 exceeds the actual amount of tape remaining on supply reel 2, CPU 22 triggers alarm 30 to indicate this situation.

After the predetermined time duration has expired, that is, the duration during which tape 4 is transported from supply reel 2 to take-up reel 3 so that CPU 22 can determined the characteristic type of tape which is used, and also can determine the amount of tape remaining on supply reel 2, that portion of tape which had been payed out from the supply reel is rewound thereon. Thus, following the initial operation during which the type and available quantity of tape are determined, the tape is returned to its initial position so that a recording or reproducing operation then can proceed. Thus, tape is not "wasted" during this initial operation. That is, the useful quantity of tape which is available is not reduced by reason of this initial operation.

Figure 3:
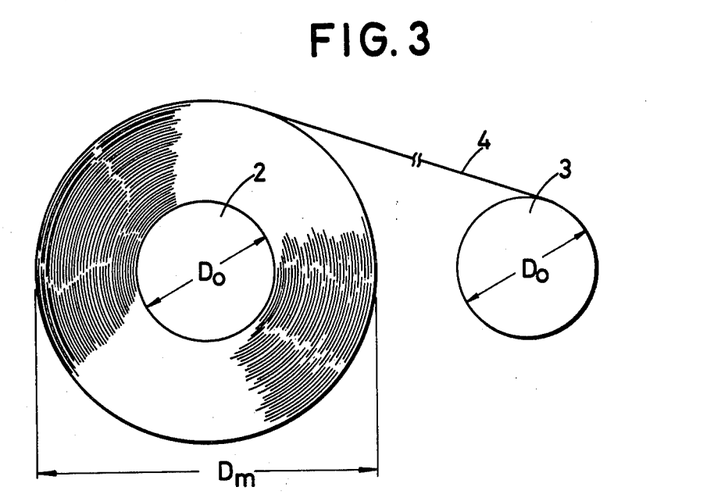
FIGS. 3 and 4 are useful in explaining the underlying principle of the present invention.

The manner in which the characteristic type of tape 4 can be determined mathematically now will be described with reference to FIGS. 3 and 4. Let it be assumed that the diameter of the hub of supply reel 2 is equal to the diameter of the hub of take-up reel 3, and is represented as $D_o$. Let it be further assumed that when all of tape 4 is wound upon, for example, supply reel 2, the total diameter of the outer coil of tape wound thereon is represented as $D_m$. Now, if the total, overall length of tape 4 is equal to L, and if the thickness of the tape is represented as $\delta/2$, then the amount of tape which is wound upon a fully-loaded supply reel can be expressed as:

$$\frac{\pi D_m^2}{4} - \frac{\pi D_o^2}{4} = L\frac{\delta}{2} \quad (1)$$
$$D_m^2 = D_o^2 + 2\delta L/\pi$$

Figure 4:
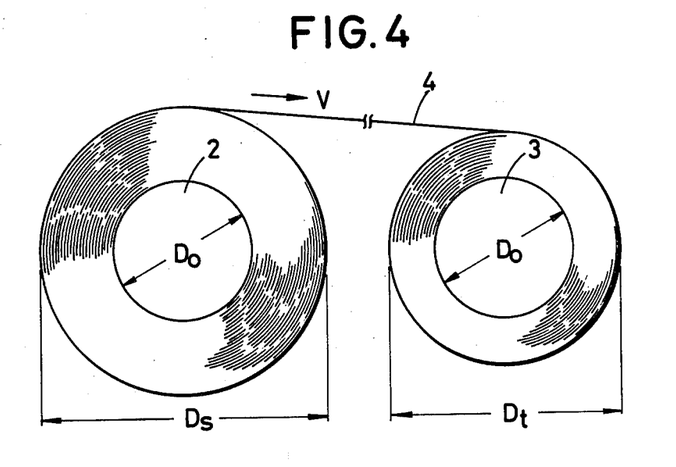

If tape 4 then runs from supply reel 2, in its fully loaded condition, to take-up reel 3, after some amount of time, a quantity of tape is wound upon the take-up reel, as illustrated in FIG. 4. For the condition shown in FIG. 4, it is assumed that the diameter of the outermost coil of tape wound upon supply reel 2 is represented as $D_s$, and the diameter of the outermost coil of tape wound upon take-up reel 3 is represented as $D_t$. Of course, as is known, the angular velocity of each reel is a function of its reel diameter. Nevertheless, since it is assumed that tape 4 is driven by a capstan, the velocity V of the tape is constant, as determined by the capstan speed. The rotational period of, for example, take-up reel 3 is equal to the time required for one rotation thereof. During this period, tape 4 is, of course, driven at the linear velocity V, and the length of tape which is wound upon the take-up reel is equal to the circumference thereof. Hence, the rotational period $T_t$ of take-up reel 3 can be expressed as:

$$T_t = \pi D_t / V \quad (2)$$

Similarly, the rotational period $T_s$ of supply reel 2 can be expressed as:

$$T_s = \pi D_s / V \quad (3)$$

Let it be assumed that m turns, or coils, of tape 4 are withdrawn from supply reel 2, and that n turns, or coils, of tape are wound upon take-up reel 3 in the arbitrary example shown in FIG. 4. With respect to the take-up reel, the diameter of the first turn thereon is equal to $D_o$, the diameter of the take-up reel hub. The diameter of the second turn is equal to $D_o + \delta$, the diameter of the take-up reel hub plus twice the thickness of the tape. The diameter of the third turn is equal to $D_o + 2\delta$. Therefore, it can be appreciated that the diameter of the $n^{th}$ turn is equal to $$D_t = D_o + (n-1)\delta \quad (4)$$

With respect to supply reel 2, if no turn had been withdrawn therefrom, the diameter of the supply reel would be equal to $D_m$. If one turn is withdrawn, the diameter of the supply reel is equal to $D_m - \delta$. If two turns have been withdrawn, the diameter of the supply reel is equal to $D_m - 2\delta$. If m turns are withdrawn from the supply reel, then its diameter can be expressed as $$D_s = D_m - m\delta \quad (5)$$

Since the entire length L of tape 4 is not changed, the diameters $D_s$ and $D_t$ of the supply and take-up reels exhibit the following relationship with respect to the maximum and minimum diameters $D_m$ and $D_o$:

$$D_s^2 + D_t^2 = D_m^2 + D_o^2 \quad (6)$$

Figure 5:
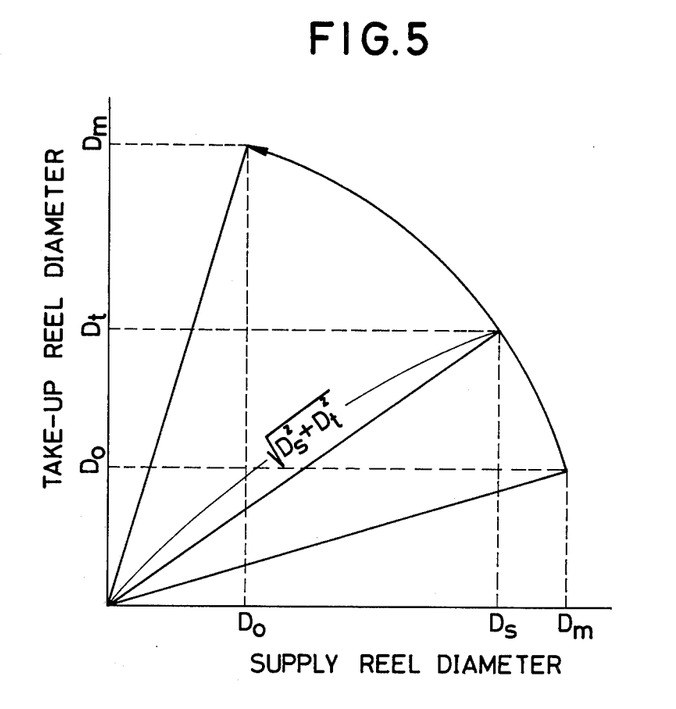
FIG. 5 is a graphical representation which is useful in understanding the present invention.

The expression $D_m^2 + D_o^2$ is constant and is dependent solely upon the characteristics of the particular tape cassette which is used. That is, this expression depends upon the diameter of the supply (or take-up) reel hub and the diameter of the fully-loaded supply (or take-up) reel, the latter being dependent upon the thickness and length of the tape which is used. Thus, from equation (6), it is seen that, regardless of the amount of tape which is wound upon the supply and take-up reels, the expression $D_s^2 + D_t^2$ is fixed and is constant for the particular cassette which is used. FIG. 5 represents the locus of $\sqrt{D_s^2 + D_t^2}$ as the values for $D_s$ and $D_t$ vary between maximum diameter $D_m$ and the minimum diameter $D_o$. If the abscissa in the graphical depiction of FIG. 5 represents the diameter $D_s$ of the supply reel, and if the ordinate represents the diameter $D_t$ of the take-up reel, then this locus moves in the counterclockwise direction from the point where $D_s = D_m$ to the point where $D_t = D_m$. That is, this locus advances in the counterclockwise direction as tape 4 is transported from supply reel 2 to take-up reel 3.

It is, of course, appreciated from equation (6) that $$\sqrt{D_s^2 + D_t^2} = \sqrt{D_m^2 + D_o^2}.$$

The radius of the circular arc, shown in FIG. 5, thus is constant for a particular cassette. Preferably, the different types of cassettes which can be used with the recording/reproducing apparatus (i.e., the VTR or the recorder/reproducer) are standardized as to the diameter of the supply (or take-up) reel hub, the thickness of the tape, the length of the tape and the maximum diameter of a fully wound reel. For convenience, Table I below identifies four different types of cassettes. It should be readily appreciated that, if desired, additional types of cassettes may be employed, each additional type having specified characteristics, that is, a specified reel hub diameter, tape thickness, tape length and maximum reel diameter:

TABLE I

| Tape Cassette | $D_o$(mm) | $\delta/2(\mu m)$ | L(m) | $D_m$(mm) | $\sqrt{D_m^2 + D_o^2}$ |
|---|---|---|---|---|---|
| Type I | 51.8 | 20 | 42 | 61.3 | 80.3 |
| Type II | 51.8 | 20 | 78 | 68.3 | 85.7 |
| Type III | 30.0 | 20 | 150 | 68.7 | 75.0 |
| Type IV | 30.0 | 14 | 222 | 69.7 | 75.9 |

It should be recognized that, once the values of $D_s$ and $D_t$ are determined, regardless of the amount of tape which may be wound on the supply or take-up reels, the expression $\sqrt{D_s^2 + D_t^2}$ is established. Since this expression is equal to the expression $\sqrt{D_m^2 + D_o^2}$, it is seen that the type of cassette which has been loaded into the recording/reproducing apparatus can be identified. As an example, CPU 22 may include a memory device having a plurality of addressable storage compartments, each storage compartment having stored therein the particular characteristics of a corresponding type of cassette. For example, storage compartment I may store information concerning the reel hub diameter $D_o$, tape width, tape length and maximum diameter $D_m$ associated with cassette Type I, as specified in Table I. The address of this storage compartment is identified by the expression $\sqrt{D_m^2 + D_o^2}$ associated with cassette Type I. Similarly, let it be assumed that storage compartment II has stored therein information as to the particular characteristics associated with cassette Type II, as indicated in Table I. This storage compartment is addressed by the appropriate value of $\sqrt{D_m^2 + D_o^2}$. The remaining storage compartments likewise have stored therein information relating to the particular characteristics of the other types of cassettes. Thus, when the values $D_s$ and $D_t$ are determined by CPU 22, the appropriate storage compartment is addressed and the characteristics of the type of cassette which is associated with the determined $D_s$ and $D_t$ are read out. Thus, after tape 4 has been transported for some predetermined time duration from supply reel 2 to take-up reel 3, the pulses supplied to CPU 22 from pick-up sensors 26 and 28 result in the reading out and display either of the type of cassette which is being used or, at least, the overall tape length or recording capacity of that cassette.

It now will be described how the type of cassette, or particular characteristics associated with that type, can be indicated directly from the determined rotational periods $T_s$ and $T_t$ of the supply and take-up reels, respectively, without first determining the diameters thereof. Equation (6) can be rewritten as:

$$D_s^2\{1 + (D_t/D_s)^2\} = D_m^2 + D_o^2 \quad (7)$$

and let it be further assumed that $$D_t/D_s = \alpha \quad (8)$$

If equation (8) is substituted into equation (7), the result is written as $$D_s^2(1+\alpha^2) = D_m^2 + D_o^2 \quad (9)$$

with the result that $$D_s = \sqrt{\frac{D_m^2 + D_o^2}{1 + \alpha^2}} \quad (10)$$

In a similar manner, equations (6) and (8) can be combined to find the expression for the diameter $D_t$ of the take-up reel as follows:

$$D_t^2(1 + 1/\alpha^2) = D_m^2 + D_o^2 \quad (11)$$

$$D_t^2(1+\alpha^2) = \alpha^2(D_m^2 + D_o^2) \quad (12)$$

$$D_t = \sqrt{\frac{\alpha^2(D_m^2 + D_o^2)}{1 + \alpha^2}} \quad (13)$$

If equations (2) and (3) are used in equation (9), the result appears as:

$$D_m^2 + D_o^2 = D_s^2(1+\alpha^2) = (V/\pi)^2 T_s^2(1+\alpha^2) = (V/\pi)^2(T_s^2 + \alpha^2 T_s^2) \quad (14)$$

From equations (2), (3) and (8), the term $\alpha^2 T_s^2$ may be rewritten as $\alpha^2 T_s^2 = T_t^2$. Thus, equation (14) may be expressed as:

$$D_m^2 + D_o^2 = (V/\pi)^2(T_s^2 + T_t^2) \quad (15)$$

and, $$T_s^2 + T_t^2 = \frac{D_m^2 + D_o^2}{(V/\pi)^2} \quad (16)$$

It is seen from the foregoing equation that the expression $T_s^2 + T_t^2$ is a constant value that is determined only by the specific type of tape cassette which is used. This is because the tape speed V is fixed and, depending upon the type of cassette, as set out in Table I above, the maximum and minimum reel diameters $D_m$ and $D_o$, respectively, are fixed.

Since the rotational periods $T_s$ and $T_t$ may be obtained directly by CPU 22 in response to the pulses supplied thereto by pick-up sensors 26 and 28, the expression $T_s^2 + T_t^2$ may be determined easily. From equation (16), the determination of this expression is indicative of the type of cassette which is used. Hence, the particular characteristics associated with each type of cassette, as set out in Table I, may be stored in storage compartments which are addressed by the determination of $T_s^2 + T_t^2$. That is, once the rotational periods of the supply and take-up reels are obtained, the type of cassette, and thus the particular characteristics of that cassette, is identified. The expression $T_s^2 + T_t^2$ can be used as an address to retrieve, or read-out, the particular characteristics which are inherent in the tape cassette whose type is identified by this address.

The mathematical derivation for indicating the amount of tape which remains wound on supply reel 2, regardless of the arbitrary quantity of tape which may be wound upon take-up reel 3, now will be discussed. Let it be assumed that this arbitrary quantity of tape which is wound upon take-up reel 3 is represented as X. This length X is equal to the circumference of the first, or innermost, turn of tape wound upon the take-up reel, plus the circumference of the second turn, plus the circumference of the third turn, and so on up to the circumference of the $n^{th}$ turn. It is recalled that the diameter of the $n^{th}$ turn is equal to $D_o + (n-1)\delta$. Therefore, the amount of tape X which is wound upon take-up reel 3 may be expressed as:

$$X = \pi D_o + \pi(D_o + \delta) + \pi(D_o + 2\delta) + \quad (17)$$
$$\cdots + \pi\{D_o + (n-1)\delta\} = \pi\left\{nD_o + \frac{n(n-1)}{2}\delta\right\}$$

Of course, the amount of tape X which is wound upon the take-up reel is equal to the amount of tape which has been withdrawn from the supply reel. This length of tape which had been withdrawn from the supply reel is equal to the circumference of the first outermost turn which had been wound thereon, plus the circumference of the next outermost turn, plus the circumference of the next turn, and so on, up to the circumference of the $m^{th}$ turn which had been wound thereon. The diameter of the first turn is equal to $D_m - \delta$, and the diameter of the $m^{th}$ turn is equal to $D_m - m\delta$. Hence, the length of tape X which had been withdrawn from supply reel 2 may be expressed as:

$$X = \pi(D_m - \delta) + \pi(D_m - 2\delta) + \cdots + \pi(D_m - m\delta) \quad (18)$$
$$= \pi\left\{mD_m - \frac{m(m+1)}{2}\delta\right\}$$

From equations (2) and (3), it is known that $D_t/T_t = D_s/T_s \cdot D_t$ thus may be written as $$D_t = T_t/T_s D_s = \alpha D_s \quad (19)$$

The term n may be obtained from equation (4) as $$n = (D_t - D_o + \delta)/\delta \quad (20)$$

and the term m may be obtained from equation (5) as $$m = D_m - D_s/\delta \quad (21)$$

Now, since equations (17) and (18) are equal, they specify the following identity:

$$\pi\left\{nD_o + \frac{n(n-1)}{2}\delta\right\} = \pi\left\{mD_m - \frac{m(m+1)}{2}\delta\right\} \quad (22)$$

If equations (19), (20) and (21) are substituted into equation (22), the result appears as $$(1+\alpha^2)D_s^2 + (1-\alpha)\delta D_s + D_o(\delta - D_o) + D_m(\delta - D_m) = 0 \quad (23)$$

In equation (23), the terms $\alpha$ and $D_s$ are not constant. Nevertheless, equation (23) can be simplified if it is assumed that:

$$1 + \alpha^2 = A$$

$$(1-\alpha)\delta = B$$

$$D_o(\delta - D_o) + D_m(\delta - D_m) = C.$$

With these assumptions, equation (23) can be solved for $D_s$ as $$D_s = \frac{-B + \sqrt{B^2 - 4AC}}{2A} \quad (24)$$

If the expression for m defined by equation (21) is substituted into equation (18), the result can be rewritten as:

$$X = \pi/2\delta(D_m - D_s)(D_m + D_s - \delta) \quad (25)$$

Of course, $D_m >> \delta$ and $D_s >> \delta$. Equation (25) thus can be simplified to $$X = \pi/2\delta(D_m^2 - D_s^2) \quad (26)$$

From the foregoing assumptions for A, B and C, a close approximation of equation (24) will be realized if it is assumed that B=0. With this assumption, equation (24) can be rewritten as:

$$D_s^2 = -C/A = (D_o^2 + D_m^2)/1 + \alpha^2 \quad (27)$$

Now, if equation (27) is substituted into equation (26), the result appears as:

$$X = \frac{\pi}{2\delta}\left(\frac{\alpha^2 D_m^2 - D_o^2}{1+\alpha^2}\right) = \frac{\pi}{2\delta}D_o^2\frac{\alpha^2\beta^2 - 1}{1+\alpha^2} \quad (28)$$

In equation (28), $\beta$ is defined as:

$$\beta^2 = \left(\frac{D_m}{D_o}\right)^2 = \frac{D_o^2 + 2\delta L/\pi}{D_o^2} \quad (29)$$

wherein $D_m$ is defined by equation (1).

The time required to transport the entire length L of tape 4 from the supply reel to the take-up reel is fixed, and is a function of the constant tape speed V. Let this time be represented as K wherein $$K = (L/V) \quad (30)$$

Now, the time required to transport that portion of tape 4 which remains on supply reel 2 is referred to as the remaining time $T_R$, and is indicative of the recording capacity of that portion of tape 4 which remains. This remaining time $T_R$ may be expressed as:

$$T_R = \frac{L - X}{V} = K\left(1 - \frac{X}{L}\right) \quad (31)$$

The term X is defined by equation (28) and the term L is defined by equation (29). When equations (28) and (29) are substituted into equation (31), this equation is rewritten as:

$$T_R = \left(\frac{K}{\beta^2 - 1}\right)\left(\frac{1+\beta^2}{1+\alpha^2} - 1\right) \quad (32)$$

From the foregoing discussion, it is appreciated that $\beta$ and K are constant values which are established by the particular type of cassette which is used. Hence, the only variable in equation (32) is the term $\alpha$. In equation (32), let it be assumed that $(\beta^2 + 1)/(\beta^2 - 1)K = P$; and $K/\beta^2 - 1 = Q$. With this assumption, equation (32) may be rewritten as:

$$T_R = P/(1+\alpha^2) - Q \quad (33)$$

Thus, since P and Q are values which are constant for a particular type of cassette, once the type of cassette is determined, as discussed above, and once the term $\alpha$ is obtained, the remaining time $T_R$, that is, the available recording capacity of the tape which remains on the supply reel, can be indicated from equation (33). This equation can, of course, be implemented in the arithmetic section of CPU 22.

From equation (8), $\alpha = D_t/D_s$. From equations (2) and (3), $D_t = VT_t/\pi$, and $D_s = VT_s/\pi$. Accordingly, $\alpha$ may be expressed as:

$$\alpha = T_t/T_s \qquad (34)$$

Of course, CPU 22 readily determines the rotational periods $T_s$ and $T_t$ in response to the pulses supplied thereto by pick-up sensors 26 and 28, respectively. Hence, in response to these pulses, CPU 22 derives the address $T_s^2 + T_t^2$ of equation (16) from which the particular type of cassette which is loaded onto the recorder/reproducer is determined. Once the type of cassette is determined, the characteristics inherent in that cassette likewise are determined. That is, the values P and Q, which are associated with that type of cassette, are ascertained. CPU 22 calculates the term $\alpha$, and retrieves the stored values of P and Q which are associated with the cassette that is being used, the type of this cassette having been determined by the calculated expression $T_s^2 + T_t^2$. CPU 22 then carries out the arithmetical operation of equation (33) to indicate the remaining time $T_R$ of tape 4. The determined type of cassette and the calculated remaining time are displayed on display device 29. Furthermore, if timer 21 had been preset by the user, the preset time is compared by CPU 22 with the calculated remaining time $T_R$. If the remaining time $T_R$ is less than the desired, preset time, alarm 30 is energized.

Figure 6:
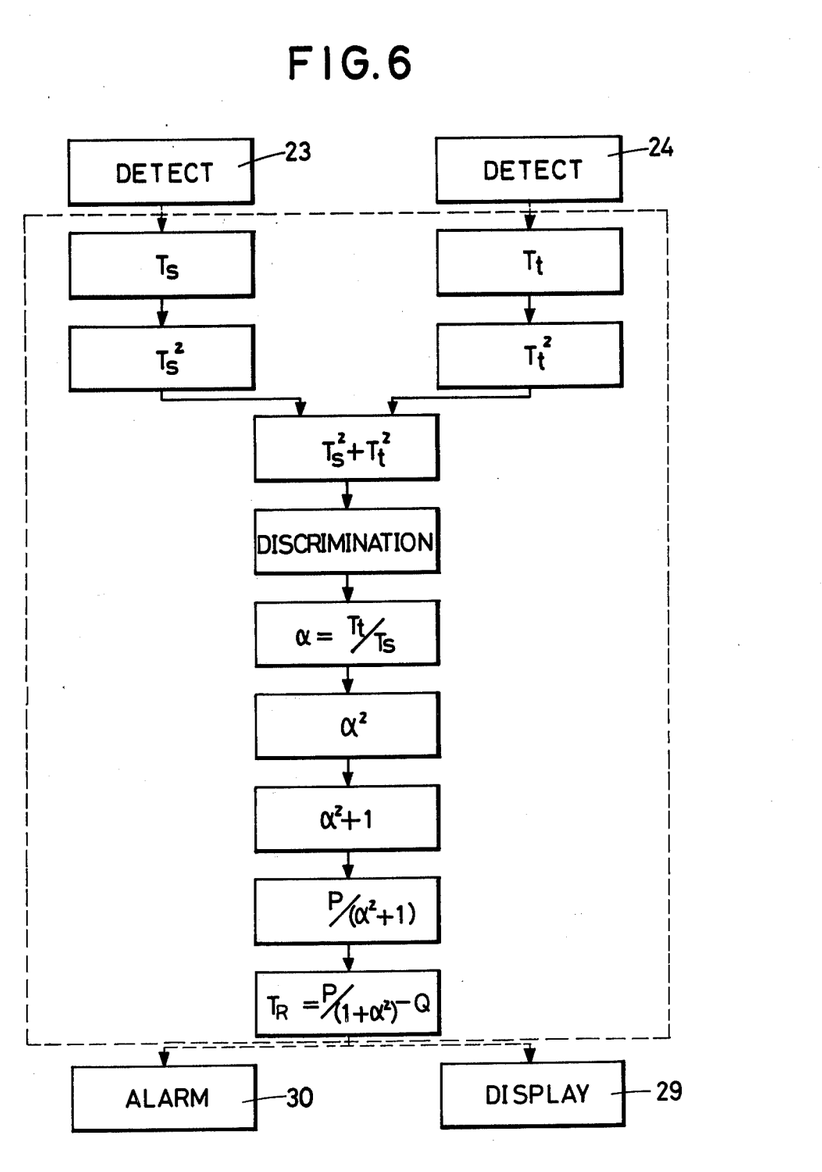
FIG. 6 is a flow diagram representing the manner in which indications as to type and available capacity of the recording tape are determined.

FIG. 6 illustrates a flow chart representing the operation of CPU 22. Pulses which are generated by detectors 23 and 24 are supplied to the CPU, and the rotational periods $T_s$ and $T_t$ are determined by the CPU in response to these pulses. The determined rotational periods $T_s$ and $T_t$ are squared to produce $T_s^2$ and $T_t^2$, and these squared rotational periods are summed to produce a signal representing the expression $T_s^2 + T_t^2$. The type of cassette then is determined in response to this expression, as by addressing a particular storage compartment which is associated with this expression. The characteristics stored in the addressed storage compartment, as represented by, for example, the characteristics set out in Table I, may be read out; and one or more of such characteristics, such as the total overall length, or recording capacity, is displayed. Also, the addressed storage compartment may store signals representing the expressions P and Q which are associated with the determined type of cassette.

CPU 22 also determines the term $\alpha$ in response to the calculated rotational periods $T_t$ and $T_s$. This term $\alpha$ then is squared and is summed with unity. The arithmetic section of CPU 22 then obtains the quotient of $P/(\alpha^2 + 1)$. The value Q is subtracted from this quotient, resulting in an indication of the remaining time $T_R$. This indication is displayed on display device 29 and, moreover, is compared to the preset time that the user may enter into timer 21. As mentioned above, if the preset time exceeds the remaining time $T_R$, alarm 31 is energized.

While the present invention has been particularly shown and described with reference to a preferred embodiment, it should be readily apparent to those of ordinary skill in the art that various changes and modifications in form and details may be made without departing from the spirit and scope of the invention. For example, this invention need not be limited solely for use in a reel-to-reel tape cassette. It is contemplated that the invention disclosed herein can be used to indicate particular characteristics and remaining recording capacity of a so-called open-reel tape. Also, although a VTR has been illustrated, it is appreciated that this invention also can be used in an audio recorder/reproducer to identify the type of tape which is used therewith, selected characteristics of that tape and the amount of recording capacity which remains. These indications are provided irrespective of the arbitrary amount of tape which may be wound on the take-up reel at the time that the tape is loaded into the recorder/reproducer. Also, the manner in which the rotation of the supply and take-up reels is detected need not be limited solely to the magnetic sensing devices illustrated herein. As an alternative, optical devices, electrostatic devices, and the like may be used to generate pulses corresponding to the angular velocities of the supply and take-up reels. It is, therefore, intended that the appended claims be interpreted as including the foregoing as well as various other such changes and modifications.

What is claimed is:

1. In apparatus for recording and/or reproducing information on recording tape transported between supply and take-up reels, the combination comprising tape drive means for driving said tape from one to the other of said reels at a predetermined speed; sensing means for sensing the rotational periods of said supply and take-up reels while said tape is driven at said predetermined speed, the rotational period of said supply reel being represented as $T_s$ and the rotational period of said take-up reel being represented as $T_t$; means for determining the overall length of said recording tape as a function of said sensed rotational periods; means for storing particular identifying characteristics associated with tapes of different lengths; and means for indicating selected ones of said stored characteristics in accordance with said sensed rotational periods.

2. The apparatus of claim 1 wherein said means for determining comprises means for obtaining a signal representing $T_s^2 + T_t^2$, means for storing representations of different tape lengths, each stored representation being associated with a respective signal representing $T_s^2 + T_t^2$, and means for indicating the stored representation of tape length which is associated with the signal which is obtained.

3. The apparatus of claim 1 wherein said means for determining comprises central processing means including an arithmetic section for obtaining a signal representing $T_s^2 + T_t^2$, memory means for storing representations of different tape lengths, each stored representation being associated with a respective signal representing $T_s^2 + T_t^2$, and comparison means for comparing said obtained signal to said stored representations.

4. The apparatus of claim 3 wherein each stored representation is representative of $$\frac{D_m^2 + D_o^2}{(V/\pi)^2},$$

wherein $D_m$ represents the maximum diameter of the supply or take-up reel when all of said recording tape is wound thereon, $D_o$ represents the minimum diameter of the supply or take-up reel when none of said recording tape is wound thereon, and V represents the predetermined speed at which said tape is driven.

5. The apparatus of claim 1 further comprising means for indicating the amount of recording tape remaining on said supply reel as a function of said sensed rotational periods and at least selected ones of said particular characteristics.

6. The apparatus of claim 1 further comprising means for indicating the amount of recording tape wound on said take-up reel as a function of said sensed rotational periods and at least selected ones of said particular characteristics.

7. In apparatus for recording and/or reproducing information on recording tape transported between supply and take-up reels, the combination comprising tape drive means for driving said tape from one to the other of said reels at a predetermined speed; sensing means for sensing the rotational periods of said supply and take-up reels while said tape is driven at said predetermined speed, the rotational period of said supply reel being represented as $T_s$ and the rotational period of said take-up reel being represented as $T_t$; means for storing predetermined constants associated with respectively different types of tapes; means for reading out selected ones of said stored constants as a function of said sensed rotational periods; and means for indicating the amount of tape wound upon one of said reels as a function of said sensed rotational periods and said read out constants.

8. The apparatus of claim 7 wherein said means for indicating comprises means for obtaining a signal $\alpha^2$ representing $(T_t/T_s)^2$, and means for deriving the signal $T_R = P/(1+\alpha^2)+Q$, wherein P and Q are constant values determined by the minimum diameter of the supply or take-up reel when none of said recording tape is wound thereon, by the total length of said recording tape, and by the predetermined speed at which said tape is driven, and wherein $T_R$ represents the remaining amount of said tape wound on said supply reel.

9. The apparatus of claim 8 wherein said means for deriving comprises central processing means including an arithmetic section programmed to add unity to the signal $\alpha^2$ to produce the signal $1+\alpha^2$, to divide a signal P by said signal $(1+\alpha^2)$, and to add a signal-Q to the quotient $P/(1+\alpha^2)$; and memory means for storing the signals P and Q associated with the tape being used.

10. The apparatus of claim 9 wherein said stored signal P represents $(\beta^2+1)/(\beta^2-1)K$, wherein $$\beta^2 = \frac{D_o^2 + 2\delta L/\pi}{D_o^2}$$

and K=L/V, and said stored signal Q represents $K/\beta^2-1$; $D_o$ being the minimum diameter of said supply or take-up reel when none of said recording tape is wound thereon, $\delta$ being twice the thickness of said recording tape, L being the total length of said recording tape and V being the predetermined speed at which said tape is driven.

11. The apparatus of claim 1 or 7 wherein said sensing means comprises respective indicia means rotatable with said supply and take-up reels; and detecting means disposed at respective reference positions for detecting said rotatable indicia means.

12. The apparatus of claim 11 wherein each indicia means comprises a rotatable member and a plurality of magnetic elements spaced uniformly in a circular array about said rotatable member; and wherein said detecting means comprises a respective magnetic sensor for generating a pulse signal in response to each magnetic element which rotates therepast.

13. The apparatus of claim 8 wherein said means for reading out selected ones of said stored constants comprises means for obtaining a signal representing $T_s^2+T_t^2$, and means for using said signal representing $T_s^2+T_t^2$ to read out the stored constants P and Q from a location in said storing means associated with said signal representing $T_s^2+T_t^2$.

14. The apparatus of claim 7 wherein said means for indicating the amount of tape wound upon one of said reels indicates the amount of recording time remaining on said recording tape; and further comprising presettable time indicating means for indicating a preset desired amount of recording time, comparison means for comparing the preset time to said remaining time, and alarm means for providing an alarm indication when said preset time exceeds said remaining time.

15. The apparatus of claim 7 further comprising display means for displaying said indicated amount of tape wound upon said one reel.

16. In apparatus for recording and/or reproducing information on recording tape transported between supply and take-up reels of equal reel hub diameter, the combination comprising tape drive means for driving said tape from one to the other of said reels at a predetermined speed; sensing means for sensing the rotational periods of said supply and take-up reels while said tape is driven at said predetermined speed, the rotational speed of said supply reel being represented as $T_s$ and the rotational period of said take-up reel being represented as $T_t$; means for obtaining a signal representing $T_s^2+T_t^2$; means for indicating predetermined identifying characteristics of said recording tape, including the total overall length thereof, as a function of said signal representing $T_s^2+T_t^2$; means for obtaining a signal $\alpha^2$ representing $(T_t/T_s)^2$; and means for indicating the remaining amount of tape wound upon said supply reel as a function of said signal $\alpha^2$ and selected ones of said indicated predetermined identifying characteristics.

17. The apparatus of claim 6 wherein said means for indicating predetermined identifying characteristics of said recording tape comprises memory means having a plurality of storage sections each associated with a respective signal representing $T_s^2+T_t^2$, each storage section storing a representation of total overall length, a signal P and a signal Q, wherein the signal P represents $(\beta^2+1)/(\beta^2-1)K$ and the signal Q represents $K/\beta^2-1$, with $$\beta^2 = \frac{D_o^2 + 2\delta L/\pi}{D_o^2},$$

K=(L/V), $D_o$ is said reel hub diameter, $\delta$ is twice the thickness of said recording tape, L is the total length of said recording tape and V is the predetermined speed at which said tape is driven; and means for addressing the storage section associated with the signal representing $T_s^2+T_t^2$.

18. The apparatus of claim 17 wherein said means for indicating the remaining amount of tape wound upon said supply reel comprises arithmetic means for deriving the signal $T_R = P/1+\alpha^2-Q$, wherein P and Q are read from the storage location addressed by said signal representing $T_s^2+T_t^2$ and $T_R$ represents the remaining length of said tape.

19. The apparatus of claim 17 further comprising display means for displaying the total overall length read from the storage section addressed by said signal representing $T_s^2+T_t^2$.

20. The apparatus of claim 18 further comprising display means for displaying the derived signal $T_R$.

21. A method of displaying the total overall length of a recording tape that is transportable from a supply reel to a take-up reel, comprising the steps of driving said tape at a constant speed for a predetermined time duration irrespective of the amount of tape that is wound upon said take-up reel; sensing the respective rotations of said supply and take-up reels; determining the rotational period $T_s$ of said supply reel in response to the sensed rotation thereof and determining the rotational period $T_t$ of said take-up reel in response to the sensed rotation thereof; storing respective indications of the total overall lengths of different recording tapes on the basis of the determined rotational periods $T_s$ and $T_t$ of the supply and take-up reels for said different recording tapes; and displaying the indication of total overall length that is associated with rotational periods $T_s$ and $T_t$ which have been determined.

22. A method of displaying the unknown amount of recording tape which is wound upon a supply reel, comprising the steps of driving said tape at a constant speed from said supply reel to a take-up reel for a predetermined time duration; sensing the respective rotations of said supply and take-up reels; determining the rotational period $T_s$ of said supply reel in response to the sensed rotation thereof and determining the rotational speed $T_t$ of said take-up reel in response to the sensed rotation thereof; producing a signal $\alpha^2$, wherein $\alpha^2=(T_t/T_s)^2$; storing constant signals P and Q, wherein P is a function of the hub diameter of said supply reel, the thickness of said tape, the overall length of said tape, and the constant speed at which said tape is driven, and Q is a predetermined fraction of P, comprising the steps of storing a plurality of groups of P and Q signals, each group being formed of a single P signal and a single Q signal associated with a corresponding value $T_s^2+T_t^2$; selecting the one group of P and Q signals which is associated with the determined rotational periods $T_s$ and $T_t$; and displaying a signal $T_R$, wherein $T_R=P/(1+\alpha^2)-Q$.

* * * * *